United States Patent
Hwang et al.

(10) Patent No.: US 9,219,574 B2
(45) Date of Patent: Dec. 22, 2015

(54) APPARATUS AND METHOD FOR DATA TRANSMISSION

(71) Applicant: SAMSUNG SDS CO., LTD., Seoul (KR)

(72) Inventors: Jin-Bum Hwang, Seoul (KP); Young-Ho Jang, Seoul (KR); Sung-Hak Song, Seongnam-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 150 days.

(21) Appl. No.: 13/933,524

(22) Filed: Jul. 2, 2013

(65) Prior Publication Data

US 2014/0189470 A1    Jul. 3, 2014

(30) Foreign Application Priority Data

Dec. 28, 2012   (KR) .................. 10-2012-0156465

(51) Int. Cl.
*H03M 13/00* (2006.01)
*H04L 1/00* (2006.01)
*H04L 1/08* (2006.01)
*H04L 1/18* (2006.01)

(52) U.S. Cl.
CPC ............ *H04L 1/0061* (2013.01); *H04L 1/0041* (2013.01); *H04L 1/0057* (2013.01); *H04L 1/08* (2013.01); *H04L 1/18* (2013.01); *H04L 1/0072* (2013.01); *H04L 1/0083* (2013.01)

(58) Field of Classification Search
CPC ... H04L 1/0057; H04L 1/0061; H04L 1/0041; H04L 1/0083; H04L 1/0072; H04L 1/08; H04L 1/18
USPC .................................. 714/752, 776, 786, 784
See application file for complete search history.

(56) References Cited

U.S. PATENT DOCUMENTS

| | | | | |
|---|---|---|---|---|
| 6,278,716 | B1 * | 8/2001 | Rubenstein et al. | 370/432 |
| 6,782,490 | B2 * | 8/2004 | Maxemchuk et al. | 714/18 |
| 7,631,085 | B2 * | 12/2009 | Vedantham et al. | 709/227 |
| 7,675,898 | B2 * | 3/2010 | Shimonishi et al. | 370/351 |
| 7,710,908 | B2 * | 5/2010 | Larsson et al. | 370/312 |

(Continued)

FOREIGN PATENT DOCUMENTS

| | | |
|---|---|---|
| KR | 10-2008-0028896 A | 4/2008 |
| WO | 2007/005160 A1 | 1/2007 |

OTHER PUBLICATIONS

Communication dated Oct. 27, 2014 issued by Korean Patent Office in counterpart Korean Patent Application No. 10-2012-0156465.

*Primary Examiner* — Esaw Abraham
*Assistant Examiner* — Osman Alshack
(74) *Attorney, Agent, or Firm* — Sughrue Mion, PLLC

(57) ABSTRACT

Provided are a data transmission apparatus and a method for the data transmission apparatus to transmit a plurality of packets constituting transmission data to a receiving end. The data transmission apparatus for transmitting a plurality of packets constituting transmission data to a receiving end includes a packet-specific weight calculator configured to calculate packet-specific weights of respective transmission-scheduled original packets at a current time point among the plurality of packets, a packet converter configured to generate one or more error recovery packets from the original packets according to the calculated packet-specific weights, and a transmitter configured to transmit the error recovery packets to the receiving end using a plurality of sessions capable of transmission.

33 Claims, 9 Drawing Sheets

(56) References Cited

U.S. PATENT DOCUMENTS

| | | | |
|---|---|---|---|
| 7,940,644 B2* | 5/2011 | Oran et al. | 370/216 |
| 8,060,017 B2* | 11/2011 | Schlicht et al. | 455/41.2 |
| 8,310,996 B2* | 11/2012 | Nanda et al. | 370/329 |
| 8,347,048 B2* | 1/2013 | Palagummi | 711/161 |
| 8,588,077 B2* | 11/2013 | Oran | 370/238 |
| 8,787,153 B2* | 7/2014 | Begen et al. | 370/225 |
| 8,804,761 B2* | 8/2014 | Grilli et al. | 370/469 |
| 2010/0251060 A1* | 9/2010 | Doi et al. | 714/752 |
| 2011/0107043 A1* | 5/2011 | Palagummi | 711/162 |

* cited by examiner

APPARATUS AND METHOD FOR DATA TRANSMISSION

CROSS-REFERENCE TO RELATED APPLICATION

This application claims priority to and the benefit of Republic of Korea Patent Application No. 10-2012-0156465, filed on Dec. 28, 2012, the disclosure of which is incorporated herein by reference in its entirety.

BACKGROUND

1. Field of the Invention

The present disclosure relates to data transmission technology in a network.

2. Discussion of Related Art

With a recent increase in the number of interactive services based on a mobile device, etc., real-time data transmission is frequently being performed via a wireless network and so on. In such a case, data is generally transmitted in packet units using Transmission Control Protocol (TCP), but in a network path with a high packet loss rate, a delay occurs in retransmission of a lost packet. In other words, only when all the packets arrive at a receiving end, it is possible to read and process the data. However, due to a delay in the arrival of the packet that has been lost and is retransmitted, a delay occurs in total service processing time, resulting in deterioration in the quality of real-time service.

To solve this problem, data may be transmitted using User Datagram Protocol (UDP) rather than TCP. In case of UDP, data does not need to be transmitted in sequence, and even when some packets are lost, other packets do not need to wait for retransmission of the lost packets. However, since UDP does not provide a recovery algorithm for packet loss, packet loss needs to be separately processed, and in particular, passage through a firewall is limited. Although other means for reducing the transmission delay of TCP have been proposed, all of them require modification of TCP itself, and thus many difficulties lie in generally applying them. Consequently, there is a need for technology for effectively reducing a transmission delay without modifying an existing packet transmission protocol.

SUMMARY OF THE INVENTION

The present disclosure is to provide a means for minimizing a transmission delay and increasing a transmission rate when data is transmitted through a network.

According to an aspect of the present disclosure, there is provided a data transmission apparatus for transmitting a plurality of packets constituting transmission data to a receiving end, the apparatus including: a packet-specific weight calculator configured to calculate packet-specific weights of respective transmission-scheduled original packets at a current time point among the plurality of packets; a packet converter configured to generate one or more error recovery packets from the original packets according to the calculated packet-specific weights; and a transmitter configured to transmit the error recovery packets to the receiving end using a plurality of sessions capable of transmission.

According to another aspect of the present disclosure, there is provided a method for a data transmission apparatus to transmit a plurality of packets constituting transmission data to a receiving end, the method including: calculating, at a packet-specific weight calculator, packet-specific weights of respective transmission-scheduled original packets at a current time point among the plurality of packets; generating, at a packet converter, one or more error recovery packets from the original packets according to the calculated packet-specific weights; and transmitting, at a transmitter, the error recovery packets to the receiving end using a plurality of sessions capable of transmission.

According to another aspect of the present disclosure, there is provided an apparatus including: one or more processors; a memory; and one or more programs stored in the memory and configured to be executed by the one or more processors, wherein the programs include commands for: calculating packet-specific weights of respective transmission-scheduled original packets at a current time point among a plurality of packets constituting transmission data; generating one or more error recovery packets from the original packets according to the calculated packet-specific weights; and transmitting the error recovery packets to the receiving end using a plurality of sessions capable of transmission.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed embodiments of the present disclosure will be described with reference to drawings. However, the embodiments are merely examples and are not to be construed as limiting the present disclosure.

When it is determined that the detailed description of known art related to the present disclosure may obscure the gist of the present disclosure, the detailed description thereof will be omitted. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided to efficiently describe the spirit of the present disclosure to those of ordinary skill in the art.

Figure 1:
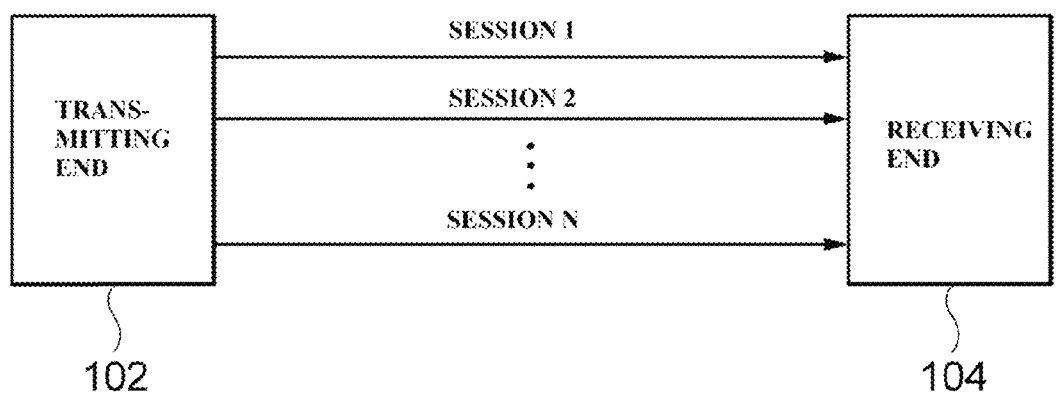
FIG. 1 is a diagram illustrating a data transmission system according to an exemplary embodiment of the present disclosure.

FIG. 1 is a diagram illustrating a data transmission system 100 according to an exemplary embodiment of the present disclosure. As shown in the drawing, the data transmission system 100 according to an exemplary embodiment of the present disclosure includes a transmitting end 102 and a receiving end 104.

In the illustrated exemplary embodiment, the transmitting end 102 is an element in a network for transmitting data, and the receiving end 104 is an element in the network for receiving the data received from the transmitting end 102. In exemplary embodiments of the present disclosure, the transmitting end 102 and the receiving end 104 are not particularly limited, and any hardware devices capable of accessing a network and processing data can be the transmitting end 102 and the receiving end 104 according to exemplary embodiments of the present disclosure without limitation. Also, in exemplary embodiments of the present disclosure, the transmitting end 102 and the receiving end 104 are obtained by classifying devices present on the network according to functions performed at a specific time point. For example, when data is reversely transmitted from the receiving end 104 to the transmitting end 102, it is to be noted that the receiving end 104 can function as a transmitting end, and the transmitting end 102 can function as a receiving end.

Data transmitted from the transmitting end 102 to the receiving end 104 may be, for example, real-time data such as real-time voice data. To transmit the data, the transmitting end 102 generates a plurality of packets from the data. The respective packets constituting the data may be generated at predetermined time intervals (e.g., 100 ms). Also, to improve transmission efficiency of the data, the transmitting end 102 may establish multiple sessions with the receiving end 104 and transmit the packets through the sessions. Although the respective sessions may be Transmission Control Protocol (TCP) sessions, they are not necessarily limited to TCP sessions, and it is also possible to use other protocols providing functions similar to those of TCP. However, in case of User Datagram Protocol (UDP), passage through a firewall is limited compared to TCP, and the reliability of packet transmission is not ensured. Thus, when UDP is used, an additional processing technique may be necessary for a packet to pass through a firewall and for the receiving end 104 to ensure reliability.

In exemplary embodiments of the present disclosure, the transmitting end 102 does not transmit the generated packets to the receiving end 104 in the form of original packets as they are, but converts the original packets into a form that can be recovered even when some of the packets are not received by the receiving end 104, and transmits the converted packets. Here, the converted packets will be referred to as error recovery packets. This will be described using examples as shown in FIG. 2 and FIG. 3.

Figure 2:
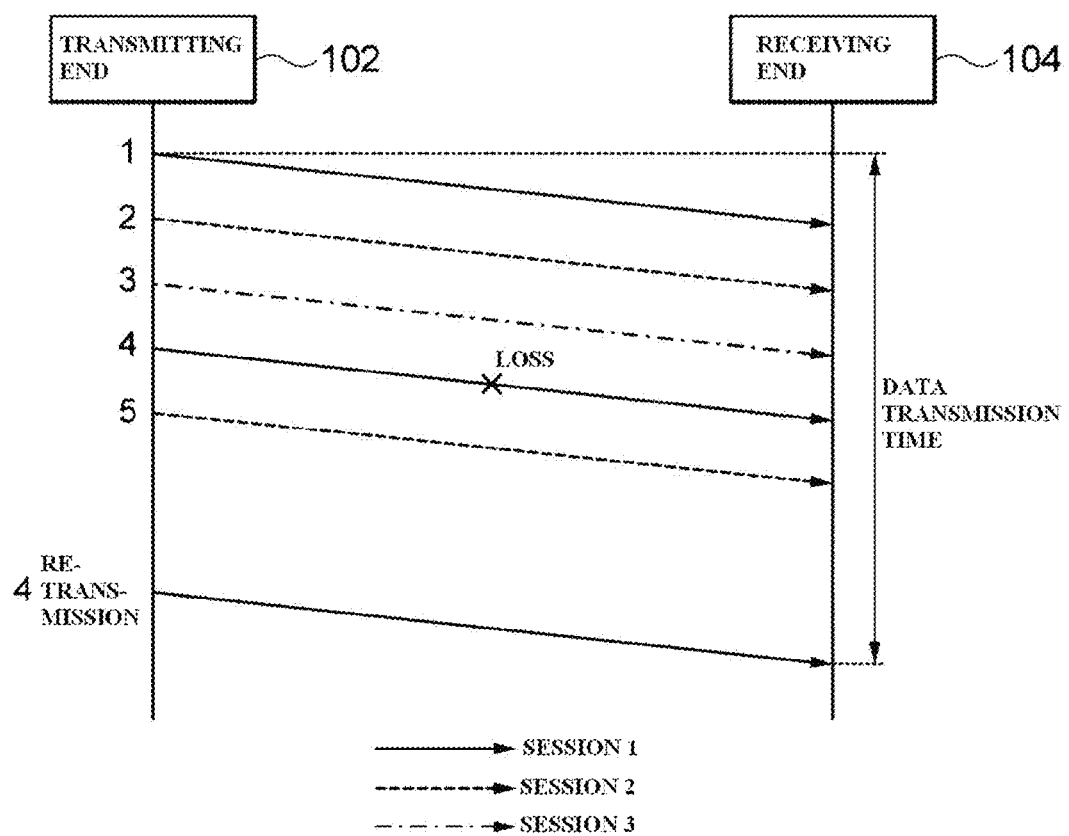
FIG. 2 is a diagram illustrating an example of a case in which a transmitting end transmits original packets to a receiving end as they are.

First, FIG. 2 is a diagram illustrating an example of a case in which the transmitting end 102 transmits original packets to the receiving end 104 as they are. In the illustrated example, it is assumed that transmission data consists of five packets (which may be thought of as packet 1 to packet 5), and the transmitting end 102 establishes three sessions (which may be thought of as session 1 to session 3) with the receiving end 104, and transmits the five packets. When packet 4 is lost in a network and does not arrive at the receiving end 104, the receiving end 104 keeps waiting to receive packet 4, and after a predetermined time elapses, the transmitting end 102 senses that packet 4 has been lost and retransmits packet 4. In other words, in this example, the receiving end 104 finishes receiving the data after the retransmitted packet 4 is received normally.

Figure 3:
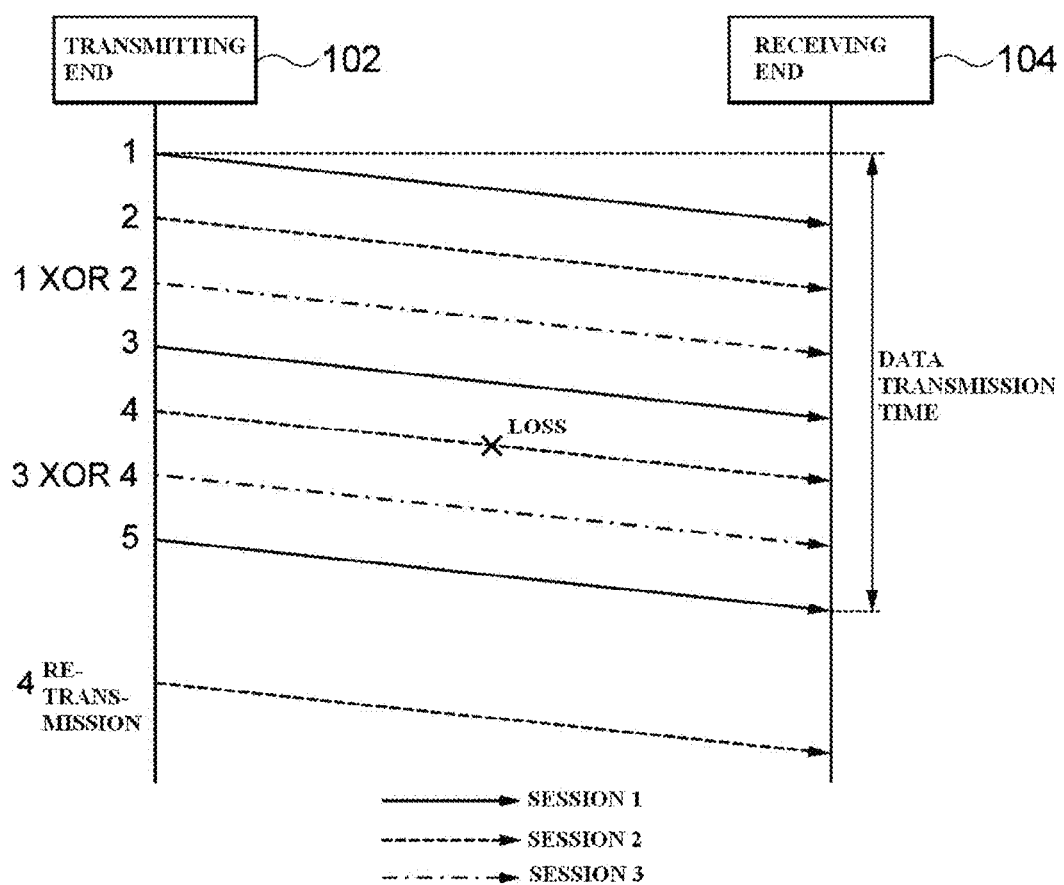
FIG. 3 is a diagram illustrating an example of a case in which a transmitting end converts original packets into a recoverable form and transmits the converted packets according to an exemplary embodiment of the present disclosure.

Next, FIG. 3 is a diagram illustrating an example of a case in which the transmitting end 102 converts original packets into a recoverable form and transmits the converted packets according to an exemplary embodiment of the present disclosure. Like in FIG. 2, in the example of FIG. 3, transmission data consists of five packets and is transmitted in three sessions. However, in this example, an exclusive disjunction of packet 1 and packet 2, that is, 1xor2 and an exclusive disjunction of packet 3 and packet 4, that is, 3xor4 are transmitted as error recovery packets together with the original packets.

In the example of FIG. 3, it is assumed that packet 4 is lost during transmission, like in FIG. 2. In this case, it is the same as in FIG. 2 that after a predetermined time elapses, the transmitting end 102 senses the loss of packet 4 and retransmits packet 4. However, in this example, packet 3 and 3xor4, which is the error recovery packet, are transmitted to the receiving end 104 normally, and without waiting for retransmission of packet 4, the receiving end 104 can recover packet 4 using the following method.

(3xor4)xor3=4

In other words, in exemplary embodiments of the present disclosure, the transmitting end 102 transmits error recovery packets generated from original packets together with the original packets, and thus even when some packets are lost during transmission, the receiving end 104 can recover the lost packets. In the exemplary embodiment, even by receiving only two packets among packet 3, packet 4, and 3xor4, it is possible to recover the other packet. The exemplary embodiment illustrates the example in which an error recovery packet is generated by performing an XOR operation on two packets, but there is no limitation in the number of packets for generating an error recovery packet. For example, an error recovery packet may be generated using three packets (packet 1 to packet 3) as follows.

Error recovery packet: (1xor2xor3)

In this case, even when any three packets among packet 1, packet 2, packet 3, and the error recovery packet 1xor2xor3 are received, the receiving end 104 can recover the other packet. In addition, although an XOR operation is used to generate an error recovery packet in the exemplary embodiment, the present disclosure is not limited to an XOR operation, and various coding methods capable of efficiently generating an error recovery packet can be used. For example, Reed-Solomon forward error correction (RS-FEC) coding, etc. can be used.

Figure 4:
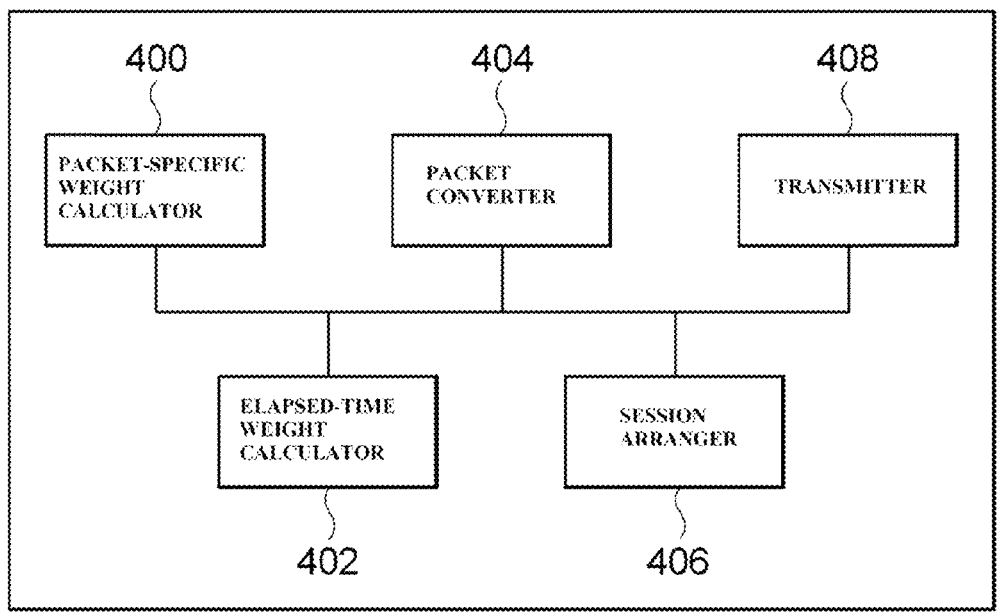
FIG. 4 is a block diagram of a transmitting end according to an exemplary embodiment of the present disclosure.

FIG. 4 is a block diagram of a transmitting end 102 according to an exemplary embodiment of the present disclosure. As shown in the drawing, the transmitting end 102 according to an exemplary embodiment of the present disclosure includes a packet-specific weight calculator 400, an elapsed-time weight calculator 402, a packet converter 404, a session arranger 406, and a transmitter 408.

The packet-specific weight calculator 400 calculates packet-specific weights of respective transmission-scheduled original packets at a current time point among a plurality of packets constituting transmission data. The transmission-scheduled original packets may include packets newly generated at the current time point and also a packet that is determined to have been transmitted already but has not arrived at a receiving end 104 and thus is waiting for retransmission. The packet-specific weight calculator 400 calculates a packet-specific weight of each of such transmission-scheduled original packets.

The packet-specific weights are used to determine the strength of the error recovery algorithms that will be applied to respective packets to generate error recovery packets. A strong error recovery algorithm provides a high probability that the corresponding packet will be recovered using a generated error recovery packet. For example, it is assumed that there are two error recovery packets as follows.

Error recovery packet 1: 1xor2
Error recovery packet 2: 1xor2xor3

While error recovery packet 1 between the error recovery packets only requires packet 2 to recover packet 1, error recovery packet 2 requires two packets packet 2 and packet 3 to recover packet 1. In this case, the recovery strength of error recovery packet 1 is higher than that of error recovery packet 2. (However, this is under the assumption that transmission of packets 1, 2, and 3 has not been finished yet. In other words, when packets 2 and 3 have been transmitted to the receiving end 104 already, 1 xor2 and 1 xor2xor3 both have the same probability of recovering packet 1, and thus have the same strength.) Also, by increasing the number of error recovery packets, it is possible to increase the strengths of the error recovery packets. For example, when the error recovery packet 1xor2 is transmitted together with the error recovery packet 1xor3, it is possible to recover packet 1 using only one of packets 2 and 3, and the recovery strength for packet 1 becomes higher than that of a case in which only 1xor2 is transmitted.

In exemplary embodiments of the present disclosure, the weights of the respective original packets may be calculated according to probabilities that the respective original packets will be recovered at the receiving end 104 within a set time. In other words, the packet-specific weights may be applied such that the lower a probability that a packet will be recovered at the receiving end 104 within the set time, the higher of a weight will be given to the packet.

Specifically, a probability that a specific original packet will be recovered at the receiving end 104 within the set time may be calculated using the following method. To estimate the probability of recovering a specific original packet in exemplary embodiments of the present disclosure, a round trip time (RTT) between the transmitting end 102 and the receiving end 104, an RTT variance (RTTvar) of the RTT, a retransmission timeout (RTO) value of a session in which the packet is transmitted, and a packet loss rate $\rho$ between the transmitting end 102 and the receiving end 104 are used. In addition, there is a need for a one-way network delay time (without considering retransmission) taken for the packet to go from the transmitting end 102 to the receiving end 104. As the one-way network delay time, a value obtained by halving the RTT or a value estimated according to a known algorithm may be used.

First, a probability that a specific original packet i will be recovered at the receiving end 104 within a time T is assumed to be $P^i_{rcv}(T)$. The packet i may be recovered at the receiving end 104 in the following two cases:

i) a case in which the original packet of the packet i having already been transmitted arrives at the receiving end 104, and ii) a case in which the packet i is recovered at the receiving end 104 by error recovery packets of the packet i having already been transmitted.

In other words, the probability that the specific original packet i will be recovered at the receiving end 104 within the time T may be calculated by summing the probability of case i) and the probability of case ii).

It is assumed that a set of recovery packets for recovering the packet i is J, and a set of other original packets required to recover the packet i using an error recovery packet j satisfying j∈J is $K_{ji}$. For example, when i=1 and the recovery packet j=1 xor2, the set $K_{ji}$ of packets required to recover the packet i using the recovery packet j is {2}. In this case, the probability $P^i_{rcv}(T)$ that the original packet i will be recovered at the receiving end 104 within the time T may be calculated as Equation 1 below.

$$P_{rcv}^i(T)=1-[\{1-P_{arr}^i(T)\}\times\Pi_{j\in J}\{1-P_{arr}^j(T)\times\Pi_{k\in K_{ji}}P_{arr}^k(T)\}] \quad [\text{Equation 1}]$$

Here, $P^i_{rcv}(T)$ is the probability that the packet i will be recovered at the receiving end 104 within the time T, $P^i_{arr}(T)$ is a probability that the packet i will arrive at the receiving end 104 within the time T, J is the set of the error recovery packets generated to recover the packet i, $P^j_{arr}(T)$ is a probability that the error recovery packet j will arrive at the receiving end 104 within the time T, $K_{ji}$ is the set of the packets required to recover the packet using the error recovery packet j, and $P^k_{arr}(T)$ is a probability that a packet k belonging to $K_{ji}$ will arrive at the receiving end 104 within the time T.

In other words, $P^i_{rcv}(T)$ is a value obtained by subtracting a probability that the packet i will not be recovered from 1. The packet i is not recovered when the original packet does not arrive within the time T, and also at least one of the recovery packets for the packet and the other original packets required for recovery does not arrive.

To calculate a probability $P^a_{arr}(T)$ that a specific packet a will arrive at the receiving end 104 within the time T, a maximum number of retransmission Na permissible for the packet a to arrive within the time T should be calculated first. For example, in the TCP standard, even when an RTO occurs after the transmitting end 102 transmits a packet, if an acknowledgement (ACK) of the packet is not received, a timeout is caused and the packet is retransmitted. Also, every time a timeout occurs, an RTO is reset to double, thereby exponentially increasing intervals of timeout occurrence. In consideration of this, Na may be calculated as Equation 2 below.

$$N_a = \text{argmax}_n \left\{\sum_{i=1}^{n} RTO \times 2^{i-1} - (curTime - sentTime_a) + \left(\frac{RTT}{2}\right) < T\right\} \quad [\text{Equation 2}]$$

In the equation, RTO denotes an RTO of a session in which the packet a is transmitted, RTT denotes an RTT between the transmitting end 102 and the receiving end 104, curTime denotes a current time, and sentTime denotes an initial transmission time of the packet a. Also, argmax$_n${condition} denotes the largest value among values of n satisfying a condition.

The probability $P^a_{arr}(T)$ that the specific packet a will arrive at the receiving end 104 within the time T may be calculated as Equation 3 below. In the equation, $\rho$ denotes a packet loss rate between the transmitting end 102 and the receiving end 104, $$P_{arr}^a(T)=1-\rho^{Na} \quad [\text{Equation 3}]$$

Next, the elapsed-time weight calculator 402 calculates a weight according to an elapsed time from a transmission start time of the transmission data. The elapsed-time weight calculator 402 calculates a weight according to the elapsed time because an influence of packet loss exerted on an overall data transmission time varies according to the elapsed time after a time point at which data transmission is started.

Figure 5:
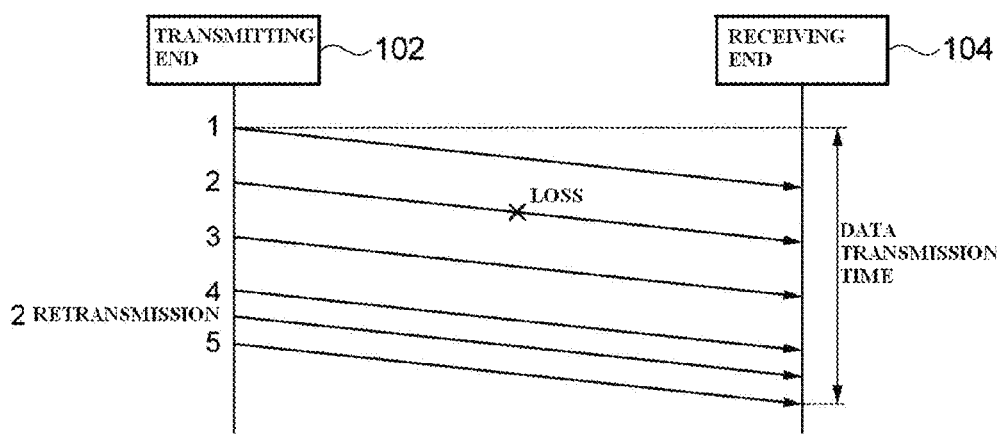
FIG. 5 and FIG. 6 are diagrams illustrating an influence of packet loss exerted on an overall data transmission time according to an elapsed time from a start time of data transmission.
Figure 6:
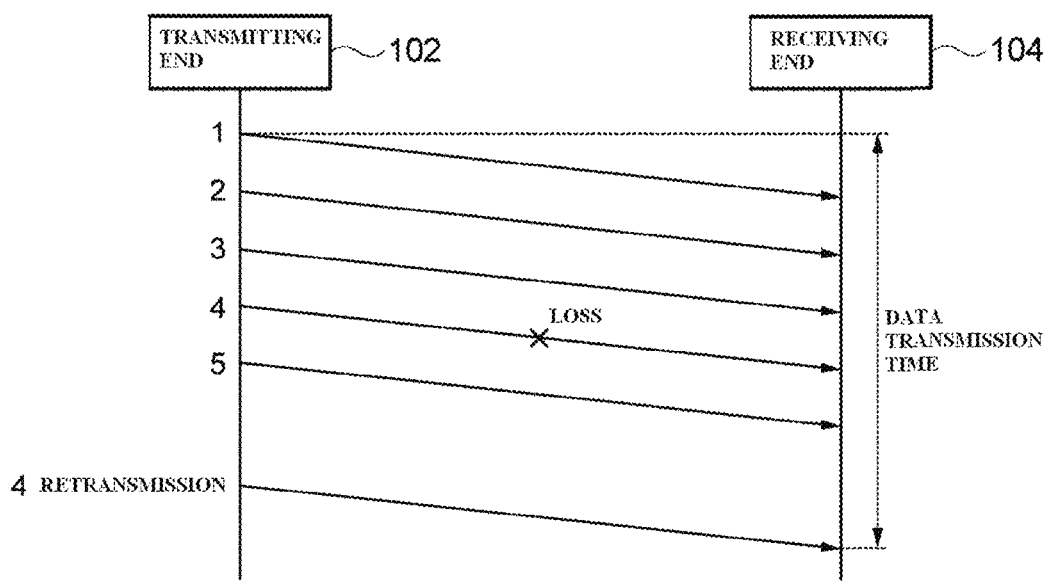

FIG. 5 and FIG. 6 are diagrams illustrating an influence of packet loss exerted on an overall data transmission time according to an elapsed time from a start time of data transmission. FIG. 5 and FIG. 6 both are under the assumption that the transmitting end 102 transmits data consisting of a total of five packets to the receiving end 104. FIG. 5 illustrates a case in which a second packet is lost and retransmitted, and FIG. 6 illustrates a case in which a fourth packet is lost and retransmitted. In the example of FIG. 5, since the lost second packet is retransmitted before transmission of packet 5, which is the last packet, and arrives at the receiving end 104, the packet loss has no influence on an overall data transmission time. On the other hand, in the example of FIG. 6, since retransmission of the lost fourth packet is performed after transmission of the last packet, the overall data transmission time increases due to the retransmission. In other words, packet retransmission at the initial stage of data transmission has little influence on an overall data transmission time, but the more time elapses, the more influence on the overall data transmission time packet retransmission has. Thus, in consideration of this, the elapsed-time weight calculator 402 calculates a weight according to an elapsed time from the transmission start time of the transmission data. The weight according to the elapsed time is used for the packet converter 404 to correct or to adjust a recovery code strength, which will be described later.

Figure 7:
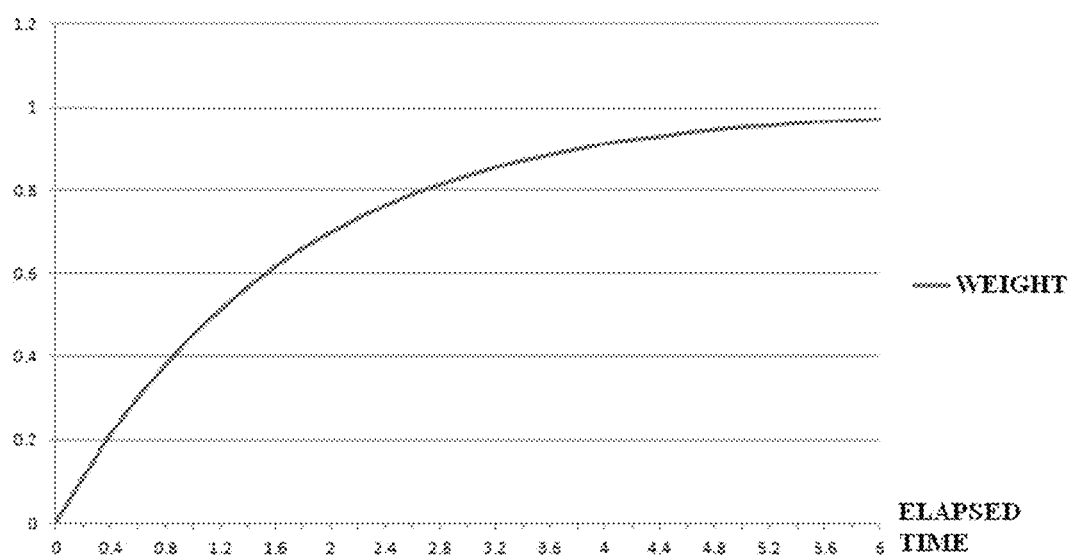
FIG. 7 and FIG. 8 are graphs showing examples of a method of calculating a weight according to an elapsed time.
Figure 8:
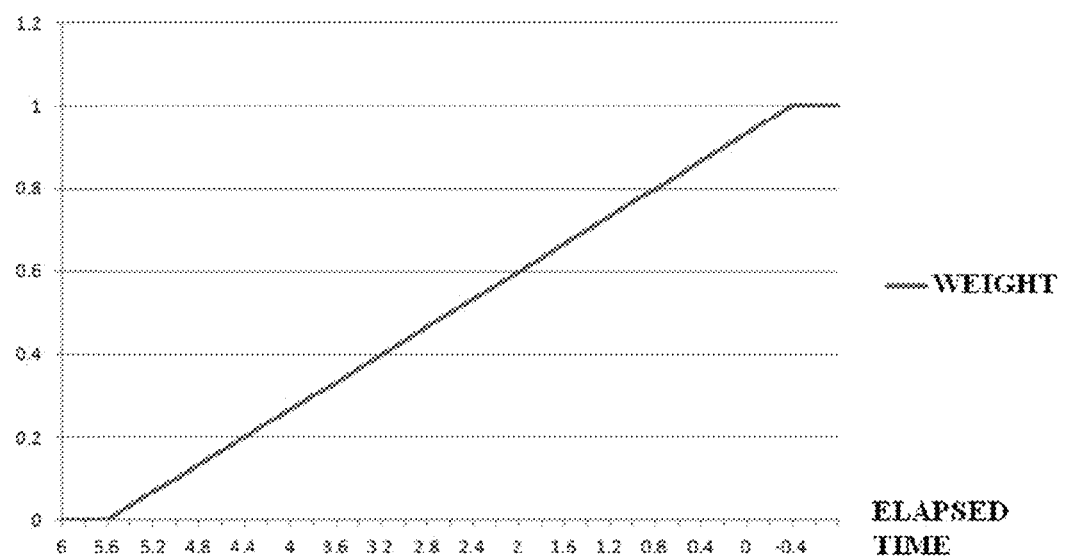

Specifically, the weight according to the elapsed time may be set to have a minimum value at the point in time of the initial transmission of the transmission data, and to increase with the passage of the transmission time. For example, the weight may be set to increase in a logarithmic fashion according to the elapsed time as shown in FIG. 7, or linearly increase according to the elapsed time as shown in FIG. 8. However, these are merely examples, and the weight according to the elapsed time can be set in various forms other than these. Also, in this exemplary embodiment, the weight is set to increase with the passage of time from the transmission time of the transmission data, but when a scheduled transmission time of the last packet is known, it is also possible to set the weight according to a remaining time between a current time and the scheduled transmission time of the final packet.

Next, the packet converter 404 generates one or more error recovery packets from the original packets according to the packet-specific weights calculated by the packet-specific weight calculator 400 and the weight calculated according to the elapsed time by the elapsed-time weight calculator 402. As mentioned above, various algorithms may be used for methods of generating the error recovery packet, and among the methods, a method using exclusive disjunction (XOR) and a method using RS-FEC will be described below as examples.

First, the method of generating an error recovery packet using exclusive disjunction (XOR) will be described. It is assumed that at a current point in time, there are 10 transmission-target original packets as follows.

P1, P2, P3, . . . , P10

The packet converter 404 classifies the transmission-target original packets into a plurality of sections according to the packet-specific weights calculated by the packet-specific weight calculator 400. For example, the packet converter 404 may normalize the packet-specific weights calculated by the packet-specific weight calculator 400 as values of 0 to 1, and classify the normalized weights into five sections including section 1 (weights are 0.8 or more and 1.0 or less), section 2 (weights are 0.6 or more and less than 0.8), section 3 (weights are 0.4 or more and less than 0.6), section 4 (weights are 0.2 or more and less than 0.4), and section 5 (weights are 0.0 or more and less than 0.2). Here, it is assumed that the transmission-target original packets are classified according to the packet-specific weights as follows.

Section 1 (weights 0.8 to 1.0): P10, P9
Section 2 (weights 0.6 to 0.8): P8
Section 3 (weights 0.4 to 0.6): P7, P6
Section 4 (weights 0.2 to 0.4): P5, P4, P3
Section 5 (weights 0.0 to 0.2): P2, P1

After the packets are classified into the plurality of sections in this way, the packet converter 404 generates section-specific error recovery packets according to recovery code strengths set for the respective classified sections. Here, the section-specific recovery code strengths are values indicating how strong error recovery packets are generated according to the respective sections. For example, the recovery code strengths may be set to the numbers of original packets that are used to generate the error recovery packets according to the sections. In this case, the number of original packets may be set to be less when the weight of the corresponding section is higher. This is because, as described above, the more the number of original packets required to generate an error recovery packet, the lower a probability that the corresponding packet will be recovered. In other words, a high packet-specific weight denotes a high probability that the loss of the corresponding packet will have a significant effect, and so it is necessary to generate a strong error recovery packet. In consideration of this, the packet converter 404 sets the section-specific recovery code strengths. When the number of original packets for generating an error recovery packet is 1, the original packet is used as the error recovery packet as it is.

For example, in the example described above, section-specific weights may be set as follows.

Section 1 (weights 0.8 to 1.0): transmit the original
Section 2 (weights 0.6 to 0.8): XOR of two packets
Section 3 (weights 0.4 to 0.6): XOR of three packets
Section 4 (weights 0.2 to 0.4): XOR of four packets
Section 5 (weights 0.0 to 0.2): XOR of five packets In other words, the original is transmitted as it is in case of section 1 having the highest weight, an XOR operation is performed on two packets to generate an error recovery packet in case of section 2, and the number of packets on which an XOR operation is performed may be gradually increased in the subsequent sections. Using the recovery code strengths set as described above, section-specific error recovery packets are generated as shown below. When an error recovery packet of a specific section is generated, packets included in an upper section of the corresponding section, that is, a section having higher weights than the corresponding section, are repeatedly used. Also, when there is a section having an insufficient number of original packets for generating an error recovery packet, one or more packets among transmission-target packets included in a lower section of the corresponding section, that is, a section having lower weights than the corresponding section, are added to the corresponding section to generate an error recovery packet.

Section 1: P10, P9
Section 2: P10xorP9, P8xorP7
Section 3: P10xorP9xorP8, P7xorP6xorP5
Section 4: P10xorP9xorP8xorP7, P6xorP5xorP4xorP3
Section 5: P10xorP9xorP8xorP7xorP6, P5xorP4xorP3xorP2xorP1

As can be seen from the example, P10 and P9 belonging to section 1 are repeatedly used in section 2 to section 5, and this is the same for the other packets. Also, in case of section 2, there is no packet with P8 on which an XOR operation will be performed, and thus P7 included in section 3 is added to generate an error recovery packet P8xorP7.

After the error recovery packets are generated in this way, the generated error recovery packets are arranged according to the weights of the sections to which the respective error recovery packets belong. In other words, the respective packets are arranged such that error recovery packets belonging to an upper section having high weights are transmitted before error recovery packets belonging to a lower section. For example, the error recovery packets generated in the example described above are arranged as follows.

P10, P9, P10xorP9, P8xorP7, P10xorP9xorP8, P7xorP6xorP5, P10xorP9xorP8xorP7, P6xorP5xorP4xorP3, and P10xorP9xorP8xorP7xorP6, P5xorP4xorP3xorP2xorP1

Meanwhile, as mentioned above, the recovery code strengths may be corrected according to the weights calculated by the elapsed-time weight calculator 402 according to the elapsed time. For example, the packet converter 404 may apply the following correction values to the recovery code strengths according to the weights according to the elapsed time.

Weight 0 to 0.5: Recovery code strength +0
Weight 0.5 to 0.8: Recovery code strength +1
Weight 0.8 to 1.0: Recovery code strength +2

In the above example, "recovery code strength +1" denotes that a recovery code strength of an upper section is applied to a section lower than the upper section by one level. For example, when a recovery code strength is corrected by +2 in the above example, recovery code strengths of the respective sections are determined as follows.

Section 1 (weights 0.8 to 1.0): transmit the original
Section 2 (weights 0.6 to 0.8): transmit the original
Section 3 (weights 0.4 to 0.6): transmit the original
Section 4 (weights 0.2 to 0.4): XOR of two packets
Section 5 (weights 0.0 to 0.2): XOR of three packets In case of the original weights, the original is transmitted in section 1 only, but when the correction value is applied, the originals are transmitted in section 1 to section 3. Accordingly, a recovery code strength corresponding to section 2 of the original weights is applied to section 4, and a recovery code strength corresponding to section 3 of the original weights is applied to section 5. In this case, error recovery packets of the respective sections are as follows.

Section 1: P10, P9
Section 2: P10, P9, P8
Section 3: P10, P9, P8, P7, P6
Section 4: P10xorP9, P8xorP7, P6xorP5, P4xorP3
Section 5: P10xorP9xorP8, P7xorP6xorP5, P4xorP3xorP2, P1xorP10xorP9

Next, the method of generating an error recovery packet using RS-FEC will be described below. In case of RS-FEC, N-K recovery packets are generated to transmit K original packets and transmitted with the original packets, so that a total of N packets are transmitted. This may be presented as RS(N, K). Here, N is the total number of the transmission packets, K is the number of the original packets, and N-K is the number of the error recovery packets. When the transmitting end 102 generates the recovery packets through RS-FEC and transmits the total of N pieces of data, the receiving end 104 can recover all the pieces of original data by receiving any combination of K packets among the N packets. In other words, even when N-K packets are lost and delayed among the N packets, it is possible to recover the original packets using only K packets in order of arrival.

Like in the previous exemplary embodiment, it is also assumed in this exemplary embodiment that 10 transmission-target original packets are classified according to packet-specific weights as follows.

Section 1 (weights 0.8 to 1.0): P10, P9
Section 2 (weights 0.6 to 0.8): P8
Section 3 (weights 0.4 to 0.6): P7, P6
Section 4 (weights 0.2 to 0.4): P5, P4, P3
Section 5 (weights 0.0 to 0.2): P2, P1

After the packets are classified into the plurality of sections as shown above, the packet converter 404 generates section-specific error recovery packets according to recovery code strengths set for the respective classified sections. Here, the section-specific recovery code strengths are values indicating how strong error recovery packets are generated according to the respective sections. For example, the recovery code strengths may be set to the numbers of original packets that are used to generate the error recovery packets according to the sections. In this case, the number of original packets may be set to be less when the weight of the corresponding section is higher. This is because, as described above, the more the number of original packets required to generate an error recovery packet, the lower a probability that the corresponding packet will be recovered. In other words, a high packet-specific weight denotes a high probability that the corresponding packet will be lost, and it is necessary to generate a strong error recovery packet. In consideration of this, the packet converter 404 sets the section-specific recovery code strengths. When the number of original packets for generating an error recovery packet is 1, the original packet is used as the error recovery packet as it is.

For example, section-specific weights may be set as follows.

Section 1 (weights 0.8 to 1.0): transmit the original
Section 2 (weights 0.6 to 0.8): RS(3, 2)
Section 3 (weights 0.4 to 0.6): RS(4, 3)
Section 4 (weights 0.2 to 0.4): RS(5, 4)
Section 5 (weights 0.0 to 0.2): RS(6, 5)

In other words, the original is transmitted as it is in case of section 1 having the highest weight, RS-FEC is applied to two packets to generate an error recovery packet in case of section 2, and the number of packets to which RS-FEC is applied may be gradually increased in the subsequent sections. Using the recovery code strengths set as described above, section-specific error recovery packets are generated as shown below. When an error recovery packet of a specific section is generated, packets included in an upper section of the corresponding section, that is, a section having higher weights than the corresponding section, are repeatedly used. Also, when there is a section having an insufficient number of original packets for generating an error recovery packet, one or more packets among transmission-target packets included in a lower section of the corresponding section, that is, a section having lower weights than the corresponding section, are added to the corresponding section to generate an error recovery packet.

Section 1: P10, P9
Section 2: RS(3, 2) {P10, P9}, RS(3, 2) {P8, P7}
Section 3: RS(4, 3) {P10, P9, P8}, RS(3, 2) {P7, P6, P5}
Section 4: RS(5, 4) {P10, P9, P8, P7}, RS(5, 4) {P6, P5, P4, P3}
Section 5: RS(6, 5) {P10, P9, P8, P7, P6}, RS(6, 5) {P5, P4, P3, P2, P1}

(Here, "RS(3, 2) {P10, P9}" denotes that three packets including one error recovery packet are generated from P10 and P9 through RS-FEC.)

As can be seen from the example, P10 and P9 belonging to section 1 are repeatedly used in section 2 to section 5, and this is the same for the other packets. Also, in case of section 2, there is no packet with P8 on which an RS-FEC operation will be performed, and thus P7 included in section 3 is added to generate an error recovery packet RS(3, 2) {P8, P7}.

After the error recovery packets are generated in this way, the generated error recovery packets are arranged according to the weights of the sections to which the respective error recovery packets belong. In other words, the respective packets are arranged such that error recovery packets belonging to an upper section having higher weights are transmitted before error recovery packets belonging to a lower section. For example, the error recovery packets generated in the example described above are arranged as follows.

P10, P9, RS(3, 2) {P10, P9}, RS(3, 2) {P8, P7}, RS(4, 3) {P10, P9, P8}, RS(3, 2) {P7, P6, P5}, RS(5, 4) {P10, P9, P8, P7}, RS(5, 4) {P6, P5, P4, P3}, RS(6, 5) {P10, P9, P8, P7, P6}, and RS(6, 5) {P5, P4, P3, P2, P1}

Meanwhile, as mentioned above, the recovery code strengths may be corrected according to the weights calculated by the elapsed-time weight calculator 402 according to the elapsed time. For example, the packet converter 404 may apply the following correction values to the recovery code strengths according to the weights according to the elapsed time.

Weight 0 to 0.5: Recovery code strength +0
Weight 0.5 to 0.8: Recovery code strength +1
Weight 0.8 to 1.0: Recovery code strength +2

In the above example, "recovery code strength +1" denotes that a recovery code strength of an upper section is applied to a section lower than the upper section by one level. For example, when a recovery code strength is corrected by +2 in the above example, recovery code strengths of the respective sections are determined as follows.

Section 1 (weights 0.8 to 1.0): transmit the original
Section 2 (weights 0.6 to 0.8): transmit the original
Section 3 (weights 0.4 to 0.6): transmit the original
Section 4 (weights 0.2 to 0.4): RS(3, 2)
Section 5 (weights 0.0 to 0.2): RS(4, 3)

In case of the original weights, the original is transmitted in section 1 only, but when the correction value is applied, the originals are transmitted in section 1 to section 3. Accordingly, a recovery code strength corresponding to section 2 of the original weights is applied to section 4, and a recovery code strength corresponding to section 3 of the original weights is applied to section 5. In this case, error recovery packets of the respective sections are as follows.

Section 1: P10, P9
Section 2: P10, P9, P8
Section 3: P10, P9, P8, P7, P6
Section 4: RS(3, 2) {P10, P9}, RS(3, 2) {P8, P7}, RS(3, 2) {P6, P5}, RS(3, 2) {P4, P3}
Section 5: RS(4, 3) {P10, P9, P8}, RS(4, 3) {P7, P6, P5}, RS(4, 3) {P4, P3, P2}, RS(4, 3) {P1, P10, P9}

Next, the session arranger 406 calculates an estimated release time of each of a plurality of sessions capable of transmission and established between the transmitting end 102 and the receiving end 104, and arranges the sessions capable of transmission in order of increasing estimated release time. In exemplary embodiment of the present disclosure, a release time of each session denotes a time left until all packets having been transmitted already in the corresponding session are completely transmitted. For example, since TCP is designed to transfer packets to the application layer in sequence, even if a new packet arrives at the receiving end 104 before all the packets having been already transmitted arrive at the receiving end 104, a value cannot be read by the application layer. In other words, when a session is released and a packet is sent through the session, the packet can be directly transferred to the application layer of the receiving end 104 as long as the packet is not lost. On the other hand, a packet may be transmitted when no session is released. In this case, if already-transmitted packets have not yet arrived at the receiving end 104 due to packet loss, etc., even when the newly-transmitted packet arrives at the receiving end 104, the newly-transmitted packet can be transferred to the application layer only after all the already-transmitted packets arrive at the receiving end 104. Thus, in exemplary embodiments of the present disclosure, release times of respective sessions are calculated, and the sessions are arranged in order of increasing estimated release time.

Specifically, an estimated release time of each session may be calculated using information on a packet loss rate between the transmitting end 102 and the receiving end 104, an RTT, an RTO of the corresponding session, and a last packet transmission time in the corresponding session. For example, an estimated release time of each session may be calculated as Equation 4 below.

$$rT_i = (1-\rho) \times \left(\frac{RTT}{2}\right) + \rho(1-\rho) \times RTO + \rho^2(1-\rho) \times 2RTO - (curTime - lastT \times T_i)$$ [Equation 4]

Here, $rT_i$ denotes an estimated release time of an $i^{th}$ session, $\rho$ denotes the packet loss rate between the transmitting end 102 and the receiving end 104, RTO denotes an RTO of the $i^{th}$ session, RTT denotes an RTT between the transmitting end 102 and the receiving end 104, curTime denotes a current time, and $lastTxT_i$ denotes a last packet transmission time of the $i^{th}$ session. In Equation 4 above, only three successive losses of each packet are taken into consideration. Fourth and more packet losses have substantially very small values and thus are ignored in the estimation. Meanwhile, Equation 4 above is under the assumption of a case in which there is a packet currently being transmitted in the corresponding session, and when there is no packet currently being transmitted, an estimated release time of the corresponding session becomes 0.

Next, the transmitter 408 sequentially assigns the error recovery packets generated and arranged by the packet converter 404 to the plurality of arranged sessions capable of transmission. In other words, a first packet among the arranged error recovery packets is assigned to a session having the shortest estimated release time, and a second is assigned to a session having the second-shortest estimated release time. In the same way, the respective other packets are also assigned to the other sessions. When the number of the packets to be transmitted is larger than the number of the sessions, assignment is repeated in a recursive manner beginning with the session having the shortest estimated release time. When such a packet assignment is finished, the transmitter 408 transmits the respective packets to the receiving end 104 using the assigned sessions.

Figure 9:
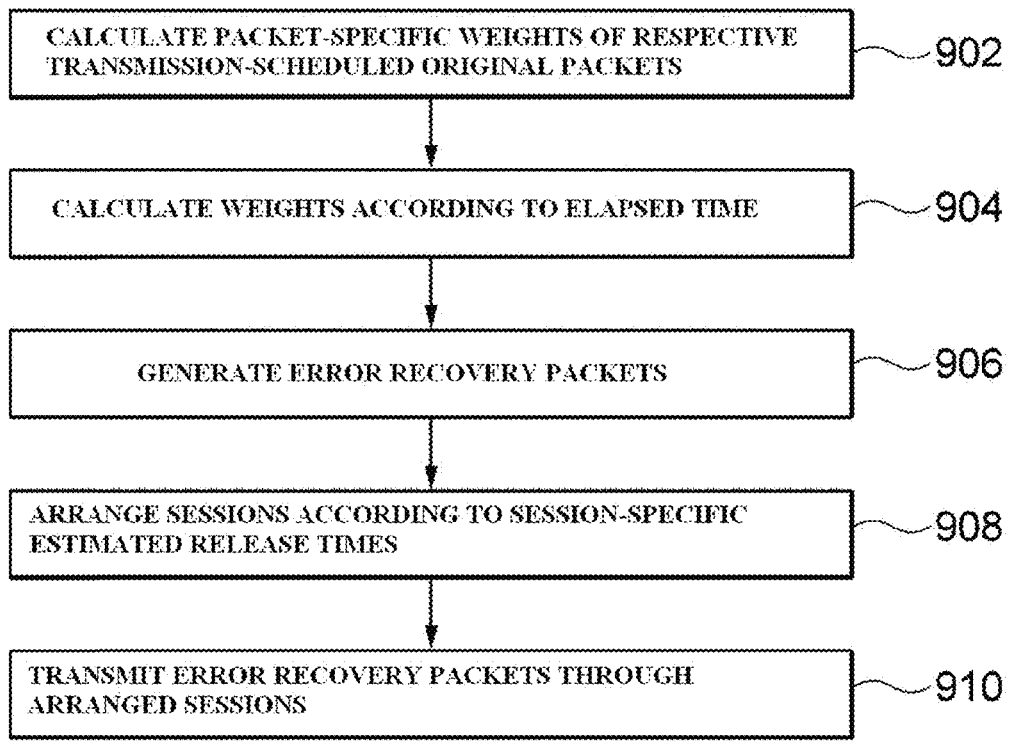
FIG. 9 is a flowchart illustrating a data transmission method according to an exemplary embodiment of the present disclosure.

FIG. 9 is a flowchart illustrating a data transmission method 900 according to an exemplary embodiment of the present disclosure. First, the packet-specific weight calculator 400 calculates packet-specific weights of respective transmission-scheduled original packets at a current time point among a plurality of packets constituting transmission data (902). The packet-specific weight calculator 400 may calculate probabilities that the respective original packets will be recovered at the receiving end 104 within a set time, and calculate packet-specific weights for the respective original packets according to the calculated probabilities. Here, a probability that a specific original packet will be recovered at the receiving end 104 within the set time may be calculated by summing a probability that the specific original packet will arrive at the receiving end 104 within the set time and a probability that other packets required to recover the specific original packet will arrive at the receiving end 104 within the set time. The detailed calculation method has been described above, and the detailed description thereof will not be reiterated.

Next, the elapsed-time weight calculator 402 calculates weights according to an elapsed time after a transmission start time of the transmission data (904). As described above, the weights according to the elapsed time may be used for the packet converter 404 to correct section-specific recovery code strengths.

Next, the packet converter 404 generates one or more error recovery packets from the original packets according to the calculated packet-specific weights (906). Specifically, the packet converter 404 may be configured to classify the original packets into a plurality of sections according to the packet-specific weights, generate section-specific error recovery packets according to recovery code strengths set for the respective classified sections, and arrange the respective generated error recovery packets according to the applied recovery code strengths. Here, the recovery code strengths may be determined to be the numbers of original packets used to generate the respective section-specific error recovery packets. The number of original packets that are combined to generate an error recovery packet in a classified section may be set to increase when a packet-specific weight of an original packet included in the corresponding section is lower.

Next, the session arranger 406 calculates an estimated release time of each of a plurality of sessions capable of transmission, and arranges the sessions capable of transmission in order of increasing estimated release time (908). Here, the session-specific estimated release times may be calculated using information on a packet loss rate between the data transmission apparatus 102 and the receiving end 104, an RTT, an RTO of the corresponding session, and a last packet transmission time in the corresponding session. The detailed method of calculating an estimated release time has been described above.

Next, the transmitter 408 sequentially assigns the error recovery packets generated and arranged by the packet converter 404 to the plurality of arranged sessions capable of transmission, and transmits the error recovery packets to the receiving end 104 using the sessions to which the error recovery packets are assigned (910).

Figure 10:
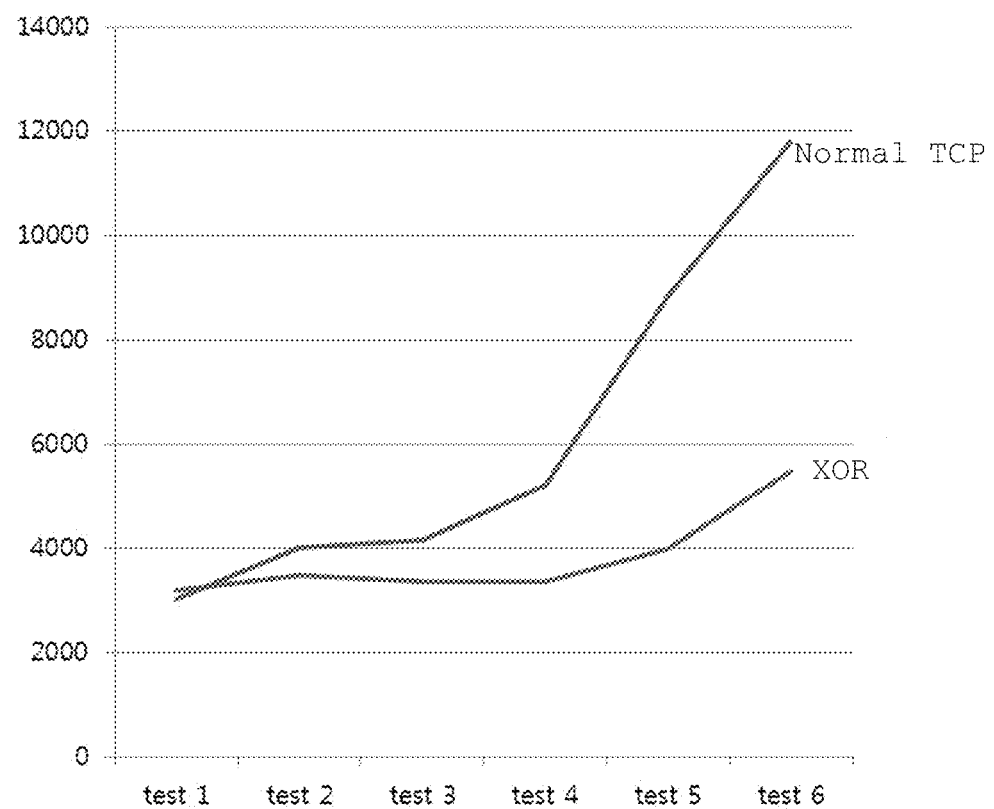
FIG. 10 is a graph for comparing data transmission rates between an exemplary embodiment of the present disclosure and related art.

FIG. 10 is a graph for comparing data transmission rates between an exemplary embodiment of the present disclosure and related art. TCP is used as a packet transmission protocol, an XOR algorithm is used as an error recovery packet generation algorithm, and test-specific loss rates and bit error rates are shown in Table 1 below. As shown in the drawing, with an increase in loss rate, a delay time drastically increases in case of general TCP, but the increase in delay time is remarkably mitigated when exemplary embodiments of the present disclosure is applied. In particular, in case of test 6, it is possible to transmit data with only half a delay of general TCP, which shows a performance improvement of 100% compared to general TCP in terms of delay time.

TABLE 1

|        | Loss Rate (%) | Bit Error Rate (%) |
|--------|---------------|--------------------|
| Test 1 | 0             | 0                  |
| Test 2 | 0             | $1*(10^{-5})$      |
| Test 3 | 2             | $2*(10^{-5})$      |
| Test 4 | 5             | $3*(10^{-5})$      |
| Test 5 | 10            | $4*(10^{-5})$      |
| Test 6 | 15            | $5*(10^{-5})$      |

Meanwhile, exemplary embodiments of the present disclosure may include a computer-readable recording medium including a program for performing the methods described in this specification in a computer. The computer-readable recording medium may separately include program commands, local data files, local data structures, or include a combination of them. The medium may be specially designed and configured for the present disclosure, or known to those of ordinary skill in the field of computer software and available. Examples of the computer-readable recording medium include: magnetic media, such as a hard disk, a floppy disk, and a magnetic tape; optical recording media, such as a CD-ROM and a DVD; magneto-optical media, such as a floptical disk; and hardware devices, such as a ROM, a RAM, and a flash memory, specially configured to store and perform program commands. Examples of the program commands may include high-level language codes executable by a computer using an interpreter, etc. as well as machine language codes made by compilers.

In exemplary embodiment of the present disclosure, upon data transmission between a transmitting end and a receiving end, error recovery packets are transmitted together with transmission-target original packets. Thus, even when some original packets are lost, it is possible to recover the lost packets at the receiving end using the error recovery packets. Also, the receiving end does not need to wait for retransmission of the lost packets, and it is possible to minimize a transmission delay caused by the packet loss.

In addition, in exemplary embodiments of the present disclosure, recovery strengths of error recovery packets are adjusted according to weights set in accordance with transmission-target packets and a time elapsed for transmission. For this reason, by applying a high recovery strength to a packet having a high probability of being lost and a low recovery strength to a packet having a low probability of being lost, it is possible to increase the probability of recovering a lost packet and also effectively use network resources.

Also, in exemplary embodiments of the present disclosure, packets are assigned to a plurality of sessions established between a transmitting end and a receiving end in consideration of states of the respective sessions, and efficiency in the use of a network is improved, so that a data transmission rate can be increased.

Furthermore, in exemplary embodiments of the present disclosure, it is unnecessary to change or modify an existing packet transmission protocol so as to apply the present disclosure, and the exemplary embodiments can be readily applied to an existing data transmitting and receiving system.

It will be apparent to those skilled in the art that various modifications can be made to the above-described exemplary embodiments of the present disclosure without departing from the spirit or scope of the present disclosure. Thus, it is intended that the present disclosure covers all such modifications provided that they come within the scope of the appended claims and their equivalents.

What is claimed is:

1. A data transmission apparatus for transmitting to a receiving end a plurality of packets, constituting transmission data, the apparatus comprising:

a transmitter configured to transmit the plurality of packets including original packets and error recovery packets;

a packet-specific weight calculator configured to calculate packet-specific weights for one or more of the original packets, wherein the packet-specific weight calculator calculates a given packet-specific weight for a given original packet of the original packets, prior to transmission of the given packet, by taking into account a current transmission time of the given packet in relation to others of the original packets; and a packet converter configured to generate one or more error recovery packets, using the one or more of the original packets, and in accordance with the calculated packet-specific weights, wherein a number of the one or more of the original packets that are combined to generate a given packet-specific error recovery packet for the given original packet is determined according to the calculated given packet-specific weight for the given original packet;

wherein the transmitter transmits the plurality of packets, including the error recovery packets and the original packets, using a plurality of transmission sessions.

2. The data transmission apparatus of claim 1, wherein the packet-specific weight calculator:

calculates probabilities that the respective original packets will be recovered at the receiving end within a set time, and calculates the packet-specific weights in a manner that takes into account the calculated probabilities.

3. The data transmission apparatus of claim 2, wherein the packet-specific weight calculator:

calculates a given packet arrival probability that the given original packet will arrive at the receiving end within a set time;

calculates an other-packets arrival probability that others of the original packets, required to recover the given original packet, will arrive at the receiving end within the set time; and obtains a given packet recovery probability, that the given original packet will be recovered at the receiving end within the set time, by combining the given packet arrival probability with the other-packets arrival probability.

4. The data transmission apparatus of claim 2, wherein the given packet recovery probability is calculated according to the following equation:

$$P_{rcv}^{i}(T)=1-[\{1-P_{arr}^{i}(T)\}\times\Pi_{j\in J}\{1-P_{arr}^{j}(T)\times\Pi_{k\in K_{ji}}P_{arr}^{k}(T)\}]$$

where:

$P_{rcv}^{i}(T)$ is a probability that a given packet i will be recovered at the receiving end within a time T, $P_{arr}^{i}(T)$ is a probability that the given packet i will arrive at the receiving end within the time T, J is a set of error recovery packets generated to recover the given packet i, $P_{arr}^{j}(T)$ is a probability that an error recovery packet j, which is a member of J, will arrive at the receiving end within the time T, $K_{ji}$ is a set of the packets required to recover the given packet i using the error recovery packet j, and $P_{arr}^{k}(T)$ is a probability that a packet k belonging to $K_{ji}$ will arrive at the receiving end within the time T.

5. The data transmission apparatus of claim 4, wherein a probability $P_{arr}^{a}(T)$ that a given packet a will arrive at the receiving end within the time T is calculated according to the following equations:

$$P_{arr}^{a}(T) = 1 - \rho^{Na}$$

$$N_a = \mathrm{argmax}_n \left\{ \sum_{i=1}^{n} RTO \times 2^{i-1} - (curTime - sentTime_a) + \left(\frac{RTT}{2}\right) < T \right\}$$

where:

Na is a maximum number of retransmission permissible for the packet a to arrive at the receiving end within the time T;

ρ is a packet loss rate between the data transmission apparatus and the receiving end, RTO is a retransmission timeout (RTO) of a session in which the packet a is transmitted, RTT is a round trip time (RTT) between the data transmission apparatus and the receiving end, curTime is a current time, and sentTime is an initial transmission time of the packet a.

6. The data transmission apparatus of claim 1, wherein the packet converter:

classifies each of the original packets into one of a plurality of classified sections, according to the respective calculated packet-specific weights, generates the error recovery packets as section-specific error recovery packets, according to respective recovery code strengths set for the classified sections, and arranges the generated error recovery packets according to the respective recovery code strengths.

7. The data transmission apparatus of claim 6, wherein the recovery code strengths correspond to numbers of the original packets used in the generation of the section-specific error recovery packets.

8. The data transmission apparatus of claim 7, wherein:

the packet converter makes a determination as to whether the given packet-specific weight, of one of the original packets of a given one of the plurality of classified sections, has a respective value lower than the respective recovery code strength for the given one of the plurality of classified sections; and when the determination is affirmative, the packet converter increases a number of the original packets combined to generate a corresponding one of the section-specific error recovery packets.

9. The data transmission apparatus of claim 7, wherein:

the packet converter makes a determination as to whether one of the plurality of classified sections has a number of the original packets insufficient to generate, in accordance with the respective recovery code strength set for the one of the plurality of classified sections, a corresponding one of the section-specific error recovery packets; and when the determination is affirmative, the packet converter generates the corresponding one of the section-specific error recovery packets by adding, to the one of the plurality of classified sections, one or more of the original packets from among the ones of the original packets included in another of the plurality of classified sections having a classification respectively lower than a respective classification of the one of the plurality of classified sections.

10. The data transmission apparatus of claim 7, wherein the packet converter generates a section-specific error recovery packet by performing one of (a) an exclusive disjunction (XOR) operation with respect to two or more of the original packets classified into a corresponding one of the plurality of classified sections, and (b) using a Reed-Solomon forward error correction (RS-FEC) algorithm.

11. The data transmission apparatus of claim 6, further comprising an elapsed-time weight calculator configured to calculate elapsed time weights according to a time elapsed since a transmission start time of the transmission data, wherein the packet converter corrects the section-specific recovery code strengths by taking into account the elapsed time weights.

12. The data transmission apparatus of claim 11, wherein the elapsed-time weight calculator calculates the weights such that a given elapsed time weight of the elapsed time weights is given a respective value that varies in accordance with the passing of time from the transmission start time of the transmission data.

13. The data transmission apparatus of claim 6, further comprising a session arranger configured to:
calculate estimated release times of the plurality of transmission sessions, so as to provide session-specific estimated release times, and
arrange the plurality of transmission sessions in an order of increasing estimated release time,
wherein the transmitter sequentially assigns the error recovery packets generated and arranged by the packet converter to the arranged plurality of transmission sessions.

14. The data transmission apparatus of claim 13, wherein a given session-specific estimated release time of the session-specific estimated release times is calculated using information on a packet loss rate between the data transmission apparatus and the receiving end, a round trip time (RTT), retransmission timeouts (RTOs) of a corresponding one of the transmission sessions, and a respective last packet transmission time in the corresponding one of the transmission sessions.

15. The data transmission apparatus of claim 14, wherein the session-specific estimated release times are calculated according to the following equation:

$$rT_i = (1-\rho) \times \left(\frac{RTT}{2}\right) + \rho(1-\rho) \times RTO + \rho^2(1-\rho) \times 2RTO - (curTime - lastT \times T_i)$$

where:
$rT_i$ is an estimated release time of an $i^{th}$ session,
$\rho$ is a packet loss rate between the data transmission apparatus and the receiving end,
RTO is an RTO of the $i^{th}$ session,
RTT is the RTT between the data transmission apparatus and the receiving end,
curTime is a current time, and
lastTxT$_i$ is a last packet transmission time of the $i^{th}$ session.

16. The data transmission apparatus of claim 14, wherein, when there is no packet currently being transmitted in a given transmission session among the plurality of transmission sessions, a respective estimated release time of the given transmission session is set to 0.

17. A method for a data transmission apparatus to transmit to a receiving end a plurality of packets, including original packets and error recovery packets, constituting transmission data, the method comprising:
calculating, at a packet-specific weight calculator, packet-specific weights of one or more of the original packets, including a given packet-specific weight for a given original packet of the original packets, prior to transmission of the given packet, by taking into account a current transmission time of the given packet in relation to others of the original packets;
generating, at a packet converter, one or more error recovery packets, using the one or more of the original packets, and in accordance with the calculated packet-specific weights; and
transmitting, at a transmitter, the plurality of packets, including the error recovery packets and the original packets, using a plurality of transmission sessions,
wherein a number of the one or more of the original packets that are combined to generate a given packet-specific error recovery packet for the given original packet is determined according to the calculated given packet-specific weight for the given original packet.

18. The method of claim 17, wherein the calculating of the packet-specific weights includes calculating probabilities that the respective original packets will be recovered at the receiving end within a set time, and calculating the packet-specific weights in a manner that takes into account the calculated probabilities.

19. The method of claim 18, wherein a the calculating of the packet-specific weights comprises:
calculating a given packet arrival probability that the given original packet will arrive at the receiving end within a set time;
calculating an other-packets arrival probability that others of the original packets, required to recover the given original packet, will arrive at the receiving end within the set time; and
obtaining a given packet recovery probability, that the given original packet will be recovered at the receiving end within the set time, by combining the given packet arrival probability with the other-packets arrival probability.

20. The method of claim 18, wherein the given packet recovery probability is calculated according to the following equation:

$$P_{rcv}^i(T) = 1 - [\{1 - P_{arr}^i(T)\} \times \Pi_{j \in J}\{1 - P_{arr}^j(T) \times \Pi_{k \in K_{ji}} P_{arr}^k(T)\}]$$

where:
$P^i_{rcv}(T)$ is a probability that a given packet i will be recovered at the receiving end within a time T,
$P^i_{arr}(T)$ is a probability that the given packet i will arrive at the receiving end within the time T,
J is a set of error recovery packets generated to recover the given packet i,
$P^j_{arr}(T)$ is a probability that an error recovery packet j, which is a member of J, will arrive at the receiving end within the time T,
$K_{ji}$ is a set of the packets required to recover the given packet i using the error recovery packet j, and
$P^k_{arr}(T)$ is a probability that a packet k belonging to $K_{ji}$ will arrive at the receiving end within the time T.

21. The method of claim 20, wherein a probability $P^a_{arr}(T)$ that a given packet a will arrive at the receiving end within the time T is calculated using the following equations:

$$P^a_{arr}(T) = 1 - \rho^{Na}$$

$$N_a = \text{argmax}_n \left\{\sum_{i=1}^n RTO \times 2^{i-1} - (curTime - sentTime_a) + \left(\frac{RTT}{2}\right) < T\right\}$$

where:
Na is a maximum number of retransmission permissible for the packet a to arrive at the receiving end within the time T, ρ is a packet loss rate between the data transmission apparatus and the receiving end, RTO is a retransmission timeout (RTO) of a session in which the packet a is transmitted, RTT is a round trip time (RTT) between the data transmission apparatus and the receiving end, curTime is a current time, and sentTime is an initial transmission time of the packet a.

22. The method of claim 17, wherein the generating of the error recovery packets includes:

classifying each of the original packets into one of a plurality of classified sections, according to the respective calculated packet-specific weights;

generating the error recovery packets as section-specific error recovery packets, according to respective recovery code strengths set for the classified sections; and arranging the generated error recovery packets according to the respective recovery code strengths.

23. The method of claim 22, wherein the recovery code strengths correspond to numbers of the original packets used in the generation of the section-specific error recovery packets.

24. The method of claim 23, wherein:

a determination is made as to whether the given packet-specific weight, of one of the original packets of a given one of the plurality of classified sections, has a respective value lower than the respective recovery code strength for the given one of the plurality of classified sections; and when the determination is affirmative, a number of original packets combined to generate a corresponding one of the section-specific error recovery packets is set to increase.

25. The method of claim 23, wherein:

the generating of the error recovery packets includes making a determination as to whether one of the plurality of classified sections has a number of the original packets insufficient to generate, in accordance with the respective recovery code strength set for the one of the plurality of classified sections, a corresponding one of the section-specific error recovery packets; and when the determination is affirmative, the corresponding one of the section-specific error recovery packets is generated by adding, to the one of the plurality of classified sections, one or more of the original packets from among the ones of the original packets included in another of the plurality of classified sections having a classification respectively lower than a respective classification of the one or the plurality of classified sections.

26. The method of claim 23, wherein the generating of one of the error recovery packets is carried out by performing one of (a) an exclusive disjunction (XOR) with respect to two or more of the original packets classified into a corresponding one of the plurality of classified sections, and (b) using a Reed-Solomon forward error correction (RS-FEC) algorithm.

27. The method of claim 22, further comprising, before the generating of the error recovery packets, calculating, with an elapsed-time weight calculator, elapsed time weights according to a time elapsed since a transmission start time of the transmission data, wherein the generating of the error recovery packets includes correcting the section-specific recovery code strengths by taking into account the elapsed time weights.

28. The method of claim 27, wherein the elapsed time weights are calculated such that a given elapsed time weight of the elapsed time weights is given a respective value that varies in accordance with the passing of time from the transmission start time of the transmission data.

29. The method of claim 22, further comprising, after the generating of the error recovery packets:

calculating, at a session arranger, estimated release times of the plurality of transmission sessions, so as to provide session-specific estimated release times, and arranging the plurality of transmission sessions in order of increasing estimated release time, wherein the transmitting of the error recovery packets includes sequentially assigning the error recovery packets generated and arranged by the packet converter to the arranged plurality of transmission sessions.

30. The method of claim 29, wherein a given session-specific estimated release time of the session-specific estimated release times is calculated using information on a packet loss rate between the data transmission apparatus and the receiving end, a round trip time (RTT), retransmission timeouts (RTOs) of a corresponding one of the transmission sessions, and a respective last packet transmission time in the corresponding one of the transmission sessions.

31. The method of claim 30, wherein the session-specific estimated release times are calculated using the following equation:

$$rT_i = (1-\rho) \times \left(\frac{RTT}{2}\right) + \rho(1-\rho) \times RTO + \rho^2(1-\rho) \times 2RTO - (curTime - lastT \times T_i)$$

where:

$rT_i$ is an estimated release time of an $i^{th}$ session,

ρ is a packet loss rate between the data transmission apparatus and the receiving end, RTO is an RTO of the $i^{th}$ session, RTT is the RTT between the data transmission apparatus and the receiving end, curTime is a current time, and $lastTxT_i$ is a last packet transmission time of the $i^{th}$ session).

32. The method of claim 30, wherein, when there is no packet currently being transmitted in a given transmission session among the plurality of transmission sessions, a respective estimated release time of the given transmission session is set to 0.

33. An apparatus, comprising:

one or more processors;

a memory; and one or more programs stored in the memory and configured to be executed by the one or more processors, wherein the programs enable the one or more processors to implement operations comprising:

calculating packet-specific weights of respective transmission-scheduled original packets by taking into account respective time until transmission among the original packets;

generating one or more error recovery packets based on the original packets, and in accordance with the calculated packet-specific weights; and transmitting the original packets and the error recovery packets to the receiving end using a plurality of transmission sessions, wherein a number of the original packets that are combined to generate an error recovery packet for a given original packet is determined according to a packet-specific weight for the given original packet.

* * * * *